(12) United States Patent
Namgoong et al.

(10) Patent No.: US 11,329,849 B2
(45) Date of Patent: May 10, 2022

(54) DEMODULATION REFERENCE SIGNAL AND CHANNEL STATE INFORMATION-REFERENCE SIGNAL RESOURCE INDICATION SYSTEM

(71) Applicants: QUALCOMM Incorporated, San Diego, CA (US); June Namgoong, San Diego, CA (US); Pavan Kumar Vitthaladevuni, San Diego, CA (US); Yu Zhang, Beijing (CN); Joseph Binamira Soriaga, San Diego, CA (US); Jing Jiang, San Diego, CA (US); Alexandros Manolakos, San Diego, CA (US)

(72) Inventors: June Namgoong, San Diego, CA (US); Pavan Kumar Vitthaladevuni, San Diego, CA (US); Yu Zhang, Beijing (CN); Joseph Binamira Soriaga, San Diego, CA (US); Jing Jiang, San Diego, CA (US); Alexandros Manolakos, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 169 days.

(21) Appl. No.: 16/619,038

(22) PCT Filed: May 28, 2018

(86) PCT No.: PCT/CN2018/088655
§ 371 (c)(1),
(2) Date: Dec. 3, 2019

(87) PCT Pub. No.: WO2018/223861
PCT Pub. Date: Dec. 13, 2018

(65) Prior Publication Data
US 2020/0351125 A1 Nov. 5, 2020

Related U.S. Application Data

(63) Continuation of application No. PCT/CN2017/089499, filed on Jun. 22, 2017, which
(Continued)

(51) Int. Cl.
*H04L 25/02* (2006.01)
*H04L 5/00* (2006.01)
(Continued)

(52) U.S. Cl.
CPC ....... *H04L 25/0224* (2013.01); *H04B 7/0421* (2013.01); *H04B 7/0626* (2013.01);
(Continued)

(58) Field of Classification Search
CPC ....... H04L 5/0048–0051; H04L 5/0073; H04L 25/0224; H04L 25/0226; H04W 72/042
See application file for complete search history.

(56) References Cited

U.S. PATENT DOCUMENTS 9,967,012 B2  5/2018  Onggosanusi et al.
10,791,542 B2  9/2020  Chen et al.
(Continued)

FOREIGN PATENT DOCUMENTS

CN  102647751 A  8/2012
CN  103379552 A  10/2013
(Continued)

OTHER PUBLICATIONS

Huawei, et al., "Enhanced Interference Measurement", 3GPP Draft, R1-167674, 3rd Generation Partnership Project (3GPP), Mobile Competence Centre, 650, Route Des Lucioles, F-06921 Sophia-Antipolis Cedex, France, vol. RAN WG1, No. Gothenburg, Sweden, Aug. 22, 2016-Aug. 26, 2016, Aug. 21, 2016 (Aug. 21, 2016), XP051126020, 6 Pages, 3GPP TSG RAN WG1 Meeting #86, Retrieved from the Internet: URL:http://www.3gpp.org/ftp/Meetings_3GPP_SYNC/RAN1/Docs/ [retrieved on Aug. 21, 2016] Paragraph 2 Paragraph 3.

(Continued)

*Primary Examiner* — Pao Sinkantarakorn
(74) *Attorney, Agent, or Firm* — Arent Fox LLP

(57) ABSTRACT

Aspects of the present disclosure disclose techniques for the indication of the allocation of the downlink (DL) demodulation reference signal (DM-RS) ports for the data channel in NR communications. In some examples, the channel state information (CSI) reference signal (CSI-RS) may be associated with a corresponding DM-RS for a DL data channel. The transmitting device, in some examples, may further transmit a notification that provides resource allocations (e.g., port allocations) that minimize the redundant information that is required to be transmitted from the base station to the user equipment (UE) when the DM-RS port allocation is the same as the CSI-RS port allocation received by the UE in an earlier time slot.

20 Claims, 4 Drawing Sheets

Related U.S. Application Data is a continuation of application No. 15/614,280, filed on Jun. 5, 2017, now Pat. No. 10,419,244.

(51) Int. Cl.
*H04W 72/04* (2009.01)
*H04B 7/0417* (2017.01)
*H04B 7/06* (2006.01)

(52) U.S. Cl.
CPC ............... *H04L 5/00* (2013.01); *H04L 5/005* (2013.01); *H04W 72/04* (2013.01)

(56) References Cited

U.S. PATENT DOCUMENTS

| | | |
|---|---|---|
| 2003/0161382 A1 | 8/2003 | Hershey et al. |
| 2010/0120442 A1 | 5/2010 | Zhuang et al. |
| 2011/0032888 A1 | 2/2011 | Matsumoto et al. |
| 2012/0009959 A1 | 1/2012 | Yamada et al. |
| 2013/0182569 A1 | 7/2013 | Bertrand et al. |
| 2013/0343299 A1 | 12/2013 | Sayana et al. |
| 2013/0343318 A1 | 12/2013 | Gruet et al. |
| 2014/0036800 A1 | 2/2014 | Frenne et al. |
| 2014/0169321 A1 | 6/2014 | Imamura et al. |
| 2014/0204825 A1 | 7/2014 | Ekpenyong et al. |
| 2014/0314041 A1 | 10/2014 | Kim et al. |
| 2014/0328422 A1 | 11/2014 | Chen et al. |
| 2014/0334392 A1 | 11/2014 | Gage et al. |
| 2015/0373739 A1 | 12/2015 | Seo et al. |
| 2016/0057716 A1 | 2/2016 | Kim et al. |
| 2016/0119936 A1* | 4/2016 | Kim ..................... H04J 11/0053 370/329 |
| 2016/0219587 A1 | 7/2016 | Lin et al. |
| 2016/0227520 A1 | 8/2016 | Davydov et al. |
| 2018/0097663 A1 | 4/2018 | Jiang et al. |
| 2019/0280909 A1 | 9/2019 | Werner et al. |
| 2019/0349221 A1 | 11/2019 | Jiang et al. |
| 2020/0014514 A1* | 1/2020 | Gao .......................... H04L 1/00 |
| 2020/0028718 A1* | 1/2020 | Wang .................... H04W 24/10 |
| 2020/0244413 A1* | 7/2020 | Takeda .................. H04L 5/0048 |

FOREIGN PATENT DOCUMENTS

| | | |
|---|---|---|
| CN | 104247291 A | 12/2014 |
| CN | 104272609 A | 1/2015 |
| CN | 104584452 A | 4/2015 |
| CN | 104685820 A | 6/2015 |
| EP | 2654333 A1 | 10/2013 |
| EP | 2897407 A1 | 7/2015 |
| WO | 2013112960 | 8/2013 |
| WO | 2014036154 A1 | 3/2014 |
| WO | 2014046516 A1 | 3/2014 |
| WO | 2014182308 A1 | 11/2014 |
| WO | 2018059021 A1 | 4/2018 |

OTHER PUBLICATIONS

LG Electronics: "Details on Non-Precoded CSI-RS designs", 3GPP Draft, R1-155396, 3GPP TSG RAN WG1 Meeting #82bis, 3rd Generation Partnership Project (3GPP), Mobile Competence Centre, 650, Route Des Lucioles, F-06921 Sophia-Antipolis Cedex, France, vol. RAN WG1, No. Malmo, Sweden, Oct. 5, 2015-Oct. 9, 2015, Oct. 4, 2015 (Oct. 4, 2015), XP051002303, pp. 1-8, Retrieved from the Internet: URL:http://www.3gpp.org/ftp/Meetings_3GPP_SYNC/RAN1/Docs/ [retrieved on Oct. 4, 2015] Paragraph 5.

LG Electronics: "DMRS Design Issues in NR", 3GPP Draft, 3GPP TSG RAN WG1 Meeting #86, R1-166907, LG DMRS Design Issues in NR Final, 3rd Generation Partnership Project (3GPP), Mobile Competence Centre; 650, Route Des Lucioles ; F-06921 Sophia-Antipolis Cedex; France vol. RAN WG1, No. Gothenburg, Sweden; Aug. 22, 2016-Aug. 26, 2016 Aug. 13, 2016 (Aug. 13, 2016), XP051132955, 7 Pages, Retrieved from the Internet: URL:http://www.3gpp.org/ftp/tsg_ran/WG1_RL1/TSGR1_86/Docs/— [retrieved on Aug. 13, 2016].

Supplementary European Search Report—EP18813681—Search Authority—Munich—dated Mar. 16, 2021.

Intel Corporation: "On PRB Bundling Enhancements for FD-MIMO Systems", 3GPP Draft; R1-152633, 3rd Generation Partnership Project (3GPP), Mobile Competence Centre; 650, Route Des Lucioles; F-06921 Sophia-Antipolis Cedex; vol. RAN WG1, No. Fukuoka, Japan; May 24, 2015, XP050972462, Retrieved from the Internet: URL:http://www.3gpp.org/ftp/Meetings_3GPP_SYNC/RAN1/Docs/, [retrieved on May 24, 2015], 4 pages.

International Search Report and Written Opinion—PCT/CN2017/089499—ISA/EPO—dated Sep. 26, 2017.

International Search Report and Written Opinion—PCT/CN2018/088655—ISA/EPO—dated Aug. 17, 2018.

Samsung: "Remaining Issues on Quasi Co-location of Antenna Ports", 3GPP Draft; R1-123493, 3rd Generation Partnership Project (3GPP), Mobile Competence Centre; 650, Route Des Lucioles; F-06921 Sophia-Antipolis Cedex; France; vol. RAN WG1, No. Qingdao; Aug. 13, 2012-Aug. 17, 2012, Aug. 5, 2012, XP050661372, Retrieved from the Internet: URL:http://www.3gpp.org/ftp/tsg_ran/WG1_RL1/TSGR1_70/Docs/ [retrieved on Aug. 5, 2012], 7 pages.

ZTE Corporation et al., "On Forward Compatibility for New Radio Interface", 3GPP Draft; R1-166210, 3rd Generation Partnership Project (3GPP), Mobile Competence Centre; 650, Route Des Lucioles; F-06921 Sophia-Antipolis Cedex; vol. RAN WG1, No. Gothenburg, Sweden; Aug. 21, 2016, XP051140118, Retrieved from the Internet: URL:http://www.3gpp.org/ftp/Meetings_3GPP_SYNC/RAN1/Docs/ [retrieved on Aug. 21, 2016], 8 pages.

\* cited by examiner

DEMODULATION REFERENCE SIGNAL AND CHANNEL STATE INFORMATION-REFERENCE SIGNAL RESOURCE INDICATION SYSTEM

CROSS-REFERENCE TO RELATED APPLICATION(S)

This application claims benefit of International Pub. No. WO 2018/059021, entitled "DEMODULATION REFERENCE SIGNAL AND CHANNEL STATE INFORMATION-REFERENCE SIGNAL RESOURCE INDICATION SYSTEM" and filed Jun. 22, 2017, which claims priority to U.S. Non-Provisional application Ser. No. 15/614,280, entitled "DEMODULATION REFERENCE SIGNAL MANAGEMENT IN NEW RADIO." Both of said applications are incorporated herein by reference as if fully set forth below and for all applicable purposes.

TECHNICAL FIELD

The technology discussed below relates generally to wireless communication and more specifically to using and implementing reference signal configurations for use in a wide variety of wireless mobile communication environments. Embodiments enable and provide solutions and techniques for efficient use of control channel capacity and high-quality channel estimation.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, and single-carrier frequency division multiple access (SC-FDMA) systems Multiple access technologies have been adopted in various telecommunication standards to provide a common protocol that enables different wireless devices to communicate on a municipal, national, regional, and even global level. For example, 5G new radio (NR) communications technology is envisaged to expand and support diverse usage scenarios and applications with respect to current mobile network generations. In an aspect, 5G communications technology includes enhanced mobile broadband addressing human-centric use cases for access to multimedia content, services and data; ultra-reliable-low latency communications (URLLC) with strict requirements, especially in terms of latency and reliability; and massive machine type communications for a very large number of connected devices and typically transmitting a relatively low volume of non-delay-sensitive information.

BRIEF SUMMARY OF SOME EXAMPLES

Aspects of the present disclosure disclose techniques for indicating downlink (DL) demodulation reference signal (DM-RS) ports for data channels in NR communications. In some examples, a channel state information (CSI) reference signal (CSI-RS) may be associated with a corresponding DM-RS for a DL data channel. In some aspects, the CSI-RS may be either included in the control channel region or the data channel region.

Embodiments may take a variety of forms including communication devices/systems include a transmitting device. A transmitting device, in some examples, may further transmit the notification that may provide resource allocations (e.g., port allocations) that minimize the redundant control information that is required to be transmitted from the base station to the user equipment (UE) when the DM-RS port allocation is the same as the CSI-RS port allocation received by the UE in an earlier time slot. To that end, aspects of the present disclosure map the CSI-RS ports to the DM-RS ports according to a one-to-one relation. The base station may also configure a non-zero power (NZP) CSI-RS resource with a set of CSI-RS ports that are further associated with a DM-RS scrambling identity (ID). As such, during the transmission of the DM-RS, the base station may simply indicate that the DM-RS port allocation is the same as a previous CSI-RS port allocation associated with a DM-RS scrambling ID. Based on the notification, the UE may be configured to determine the DM-RS ports for the PDSCH transmission intended for the UE, and the DM-RS ports for the PDSCH transmission intended for the other co-scheduled UEs.

In one example, a method for wireless communications is disclosed. The method may include associating a channel state information (CSI) reference signal (CSI-RS) with a demodulation reference signal (DM-RS) in a data channel, and mapping one or more DM-RS ports to one or more CSI-RS ports. The method may further include transmitting the CSI-RS from a base station to a user equipment (UE) during a first time slot. Transmitting the CSI-RS during the first time slot may include transmitting the indication of the CSI-RS port allocation. The method may further include transmitting the DM-RS from the base station to the UE during a second time slot. Transmitting the DM-RS during the second time slot may include transmitting a notification message that indicates that DM-RS port allocation for the UE is same as the CSI-RS port allocation received by the UE during the first time slot.

In another example, an apparatus for wireless communications is disclosed. The apparatus may include a memory configured to store instructions, and a processor communicatively coupled with the memory. The processor may be configured to execute the instructions to associate a channel state information (CSI) reference signal (CSI-RS) with a demodulation reference signal (DM-RS) in a data channel, and mapping one or more DM-RS ports to one or more CSI-RS ports. The processor may further be configured to transmit the CSI-RS from a base station to a user equipment (UE) during a first time slot. Transmitting the CSI-RS during the first time slot may include transmitting the indication of the CSI-RS port allocation. The processor may further be configured to transmit the DM-RS from the base station to the UE during a second time slot. Transmitting the DM-RS during the second time slot may include transmitting a notification message that indicates that DM-RS port allocation for the UE is same as the CSI-RS port allocation received by the UE during the first time slot.

In another example, a computer readable medium for wireless communications is disclosed. The computer readable medium may include code for associating a channel state information (CSI) reference signal (CSI-RS) with a demodulation reference signal (DM-RS) in a data channel, and mapping one or more DM-RS ports to one or more CSI-RS ports. The computer readable medium may further include code for transmitting the CSI-RS from a base station to a user equipment (UE) during a first time slot. Transmitting the CSI-RS during the first time slot may include transmitting the indication of the CSI-RS port allocation. The computer readable medium may further include code for transmitting the DM-RS from the base station to the UE during a second time slot.

Transmitting the DM-RS during the second time slot may include transmitting a notification message that indicates that DM-RS port allocation for the UE is same as the CSI-RS port allocation received by the UE during the first time slot.

In another example, apparatus for wireless communications is disclosed. The apparatus may include means for associating a channel state information (CSI) reference signal (CSI-RS) with a demodulation reference signal (DM-RS) in a data channel, and mapping one or more DM-RS ports to one or more CSI-RS ports. The apparatus may further include means for transmitting the CSI-RS from a base station to a user equipment (UE) during a first time slot. Transmitting the CSI-RS during the first time slot may include transmitting the indication of the CSI-RS port allocation. The apparatus may further include means for transmitting the DM-RS from the base station to the UE during a second time slot. Transmitting the DM-RS during the second time slot may include transmitting a notification message that indicates that DM-RS port allocation for the UE is same as the CSI-RS port allocation received by the UE during the first time slot.

Other aspects, features, and embodiments of the technology will become apparent to those of ordinary skill in the art, upon reviewing the following description of specific, exemplary embodiments in conjunction with the accompanying figures. While features of the technology discussed below may be described relative to certain embodiments and figures below, all embodiments can include one or more of the advantageous features discussed. While one or more embodiments may be discussed as having certain advantageous features, one or more of such features may also be used in accordance with the various embodiments discussed. In similar fashion, while exemplary embodiments may be discussed below as device, system, or method embodiments it should be understood that such exemplary embodiments can be implemented in varying shapes, sizes, layouts, arrangements, circuits, devices, systems, and methods.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
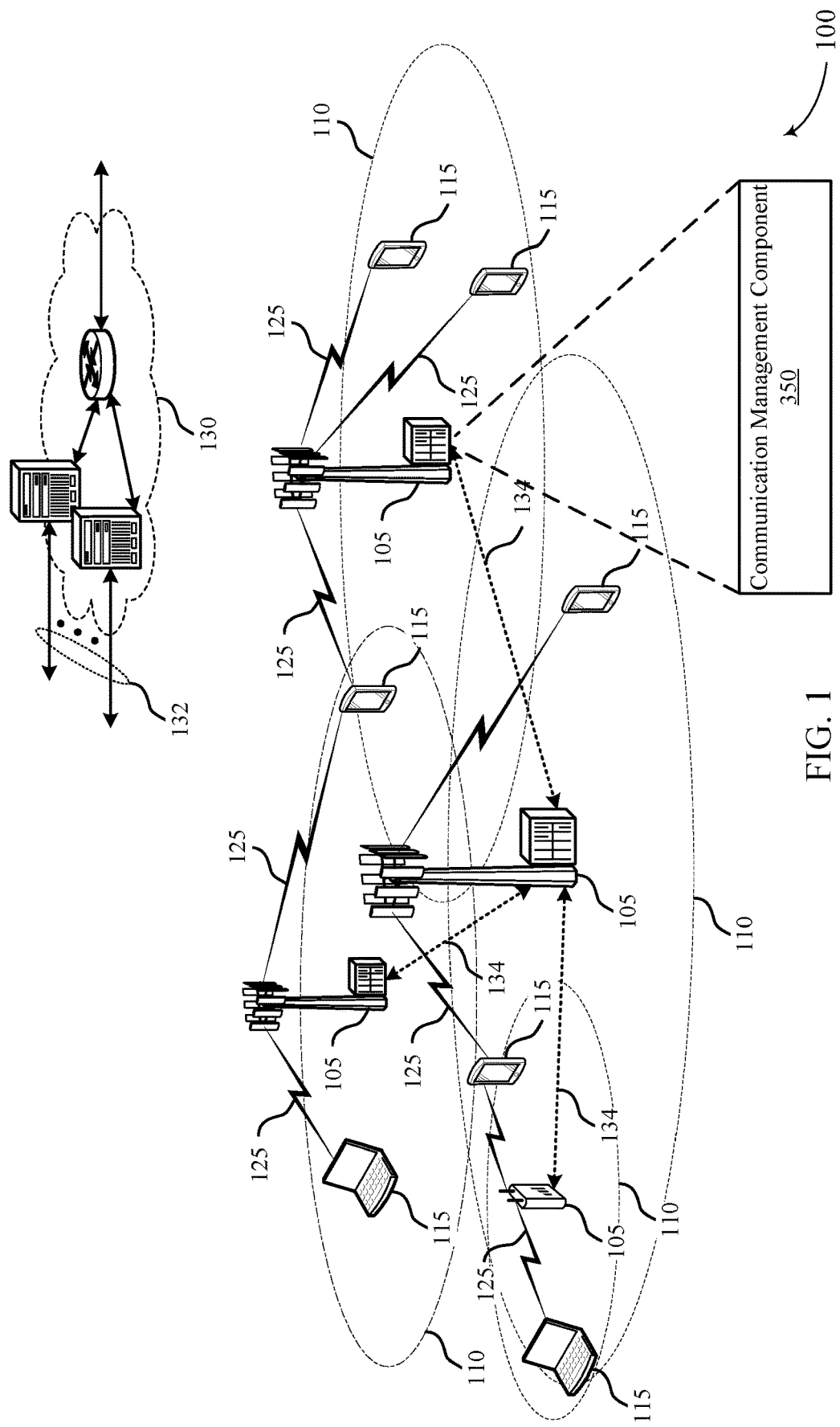
FIG. 1 illustrates an example of a wireless communications system in accordance with aspects of the present disclosure.

In several wireless communication systems, wireless receivers use one or more pilot signals to aid in demodulated the received signals. These pilot signals are commonly referred to as reference signals (RS). Some communication systems use a receiving wireless device that may have two different pilot signal types to use for data demodulation: common reference signals (CRS) and demodulation reference signals (DM-RS).

CRS are pilot signals shared by a plurality of user equipment (e.g., mobile devices), and are used for control channel and data channel demodulation. In contrast, DM-RS are intended for use by a single user equipment (UE) (e.g., a mobile device), and thus directly correspond to data targeted to a UE. The use of DM-RS and multi-antenna transmission schemes make it possible for a transmitting device (e.g., base station) to beam-form (pre-code) transmitted pilot signals and corresponding data signals. Precoding signals can be based on radio channel characteristics for communication links between the transmitting node antennas and the receiver. Doing so can yield optimized performance for any particular UE. For purposes of this disclosure, the term reference signal and pilot signal may be used interchangeably.

In some systems, precoding by a transmitting device may be used to support spatial multiplexing and allowing multiple signal streams to be transmitted simultaneously. To determine optimal precoding vectors (e.g., antenna-mapping weights used to apply phase and amplitude corrections to data and pilot signals at each of two or more antennas in a multi-antenna transmission mode), the transmitting device (e.g., base station) needs to have knowledge of the propagation channel between the transmitting device antennas and the targeted UE. This is solved by allowing the UE to report channel state information (CSI), although other techniques for the network to learn the characteristics of the downlink channel are possible. Generally, wide-band non-precoded CRS may achieve better channel estimation than UE-specific precoded DM-RS that, which at the expense of improved channel estimation, may employ non-code-book based precoding for enhanced precoding operation.

In systems operating according to the LTE specification, CRS must be transmitted in every downlink subframe, regardless of whether or not there is any downlink data transmission in the subframe. Such implementation may be resource intensive, and in absence of downlink data for one or more subframes, the inclusion of the CRS may waste valuable resources. Thus, in emerging technologies, (e.g., 5G new radio (NR) communications technology), devices that may rely primarily on DM-RS for signal demodulation, while omitting (or minimizing) the use of CRS in transmitted signals.

The DM-RS may be in the form of DM-RS for control, open-loop multiple-input and multiple-output (MIMO) based DM-RS, closed-loop MIMO based DM-RS, etc. In the absence of the CRS, there is a need to improve channel estimation for DM-RS data channels in 5G NR communication systems. Such a need may be particularly beneficial for UEs with unfavorable channel conditions (e.g., UEs at the cell-edge), and/or stringent Quality of Service (QoS) requirements (e.g., latency, reliability, etc.).

Accordingly, in absence of CRS that is typically used in the LTE systems, for 5G NR communications technology, aspects of the present disclosure rely on channel state information (CSI) reference signal (CSI-RS) to improve the channel estimation performance associated with DM-RS for the data channel. In some examples, inclusion of the CSI-RS may be based on an ad-hoc determination (e.g., for each subframe) of whether a particular slot includes any downlink data transmissions. If there is no data to be transmitted, the transmitting device may dynamically omit the CSI-RS from the control channel or the data channel. Yet if there is data to be transmitted, the transmitting device may include the CSI-RS in one or more orthogonal frequency-divisional multiplexing (OFDM) symbols that precede the data channels to allow the receiving device to efficiently demodulate the transmitted signal.

Thus, in some examples, aspects of the present disclosure may associate the CSI-RS with DM-RS in a data channel. In some respects, the CSI-RS may be either included in the control channel region or the data channel region. The transmitting device, in some examples, may further transmit a notification to a receiving device that indicates whether the CSI-RS can be used for data channel demodulation based on the association.

The base station, based on the measurements from the uplink sounding reference signal (SRS) transmission from the multiple UEs, may determine a set of co-scheduled UEs for MU-MIMO transmission, the rank for each of the co-scheduled UEs, and the precoding to be applied to each of the DM-RS antenna ports of the co-scheduled UEs. Furthermore, as noted above, the base station may transmit the beam-formed CSI-RS to the co-scheduled UEs using the same precoding and the same rank as the DM-RS, one or more slots before the transmission of the DM-RS/PDSCH. Such beam-formed CSI-RS transmitted prior to the subsequent transmission of associated DM-RS may be referred to as "pre-scheduled" CSI-RS.

To avoid transmission of redundant downlink control information (e.g., port allocation information), aspects of the present disclosure configure a base station to transmit a notification message to one or more UEs that identifies the port allocations for the UE. Specifically, in some examples, CSI-RS ports may be associated with the DM-RS ports. As such, a base station, when transmitting PDSCH to the UE, may indicate to the UE (e.g., in a downlink grant included in downlink control information (DCI)) that the DM-RS port allocation for the UE is the same as the CSI-RS port allocation that was allocated to the UE in a preceding slot. A one-to-one relation between the DM-RS ports and the CSI-RS ports may be defined, as illustrated in table and description below:

TABLE 1.0

| NZP CSI-RS Resource | DMRS Scrambling ID | CSI-RS Ports | DM-RS Ports | Utilization |
|---|---|---|---|---|
| 1 | 4 | Ports: [100, 101, 102] | Ports: [10, 11, 12] | Channel and Interference Measurement |

In the above example, DM-RS ports 10, 11, and 12 may be mapped to CSI-RS ports 100, 101, and 102, respectively. In this example, the base station may further configure a NZP CSI-RS resource "1" for channel and interference measurement. The base station may also configure a NZP CSI-RS resource with a set of CSI-RS ports that are associated with a DM-RS scrambling identity (ID). For example, the base station may associate the NZP CSIRS resource "1" with DM-RS scrambling ID "4." The NZP CSI-RS resource 1 may include CSI-RS ports 100, 101, and 102 that are each associated with the DM-RS scrambling ID "4."

Thus, in accordance with aspects of the present disclosure, during the transmission of the slot that contains the pre-scheduled CSIRS, the base station may indicate to the first UE that CSI-RS ports 100 and 101 associated with DM-RS scrambling ID "4" are for the channel measurement. By process of elimination, the first UE receiving the notification from the base station, may determine that while CSI-RS ports 100 and 101 associated with DM-RS scrambling ID "4" are for channel measurement, CSI-RS port 102 associated with DM-RS scrambling ID "4" may be used for the interference measurement. Thus, when the first UE receives DM-RS, with the indication that DM-RS port allocation is the same as the CSI-RS port allocation, the first UE is able to determine that DM-RS ports 10 and 11 with the DM-RS scrambling ID "4" may be for PDSCH transmission for the first UE, while DM-RS port 12 with DM-RS scrambling ID "4" may be for PDSCH transmission to a second UE.

Similarly, the base station may indicate to the second UE that CSI-RS port 102 associated with DM-RS scrambling ID "4" is for the channel measurement. The second UE would thus recognize that the CSI-RS ports 100 and 101 associated with DM-RS scrambling ID "4" are for the interference measurements. As such, when the second UE receives DM-RS with the indication that DM-RS port allocation is the same as the CSI-RS port allocation, the second UE may determine that the DM-RS port 12 with DM-RS scrambling ID "4" may be for PDSCH transmission for the second UE, while DM-RS ports 10 and 11 with DM-RS scrambling ID "4" may be for PDSCH transmission for the other UEs (e.g., first UE).

Additionally or alternatively, to support the non-orthogonal DM-RS ports, features of the present disclosure may configure multiple NZP CSIRS resources, each associated with a DM-RS scrambling ID, but each with a subset of the same set of CSI-RS ports. For example, the base station may configure two NZP CSI-RS resources for channel and interference measurement. The base station may associate NZP CSI-RS resource 1 with DM-RS scrambling ID=1, and NZP CSI-RS resource 2 with DM-RS scrambling ID=2. NZP CSI-RS resource 1 may include CSI-RS ports {100, 101, 102, and 103}, each associated with DM-RS scrambling ID=1. NZP CSI-RS resource 2 may include the CSI-RS ports {100 and 101} associated with DM-RS scrambling ID=2. Thus, in the above example, the base station may configure a first NZP CSI-RS resource with a first set of the one or more CSI-RS ports to a first DM-RS scrambling ID, a second NZP CSI-RS resource with a second set of the one or more CSI-RS ports to a second DM-RS scrambling ID. In some examples, while the first set of the one or more CSI-RS ports and second set of the one or more CSI-RS ports may be selected from a group of available CSI-RS ports.

In the above example, DM-RS ports 10, 11, 12, and 13 may be mapped to CSI-RS ports 100, 101, 102, and 103, respectively. During the transmission of the slot that contains the pre-scheduled CSIRS, the base station may indicate to the first UE that CSI-RS port 101 associated with DM-RS scrambling ID=1 is for channel measurement. As such, the UE, by process of elimination, may determine that the CSI-RS ports {100, 102, 103} associated with DM-RS scrambling ID=1 are reserved for interference measurement. Also, UE may determine that the CSIRS ports {100, 101} associated with DM-RS scrambling ID=2 are for the interference measurement.

Thus, when the first UE receives a DM-RS with the indication that the DM-RS port allocation is the same as the CSI-RS port allocation, the UE may determine that DM-RS port 11 with the DM-RS scrambling ID=1 is for the PDSCH transmission to the first UE, and DM-RS ports {10, 12, 13} with DM-RS scrambling ID=1 and DM-RS ports {10, 11} with DM-RS scrambling ID=2 are for PDSCH transmission to other UEs. This may help the UE employ the advanced receiver processing by allowing the channel estimation of the layers corresponding to the non-orthogonal ports of the other UEs since the scrambling IDs may become associated to the UE.

Referring first to FIG. 1, an example wireless communication network 100 is described. The wireless communication network 100 may include one or more base stations 105, one or more UEs 115, and a core network 130. The core network 130 may provide user authentication, access authorization, tracking, internet protocol (IP) connectivity, and other access, routing, or mobility functions. The base stations 105 may interface with the core network 130 through backhaul links 134 (e.g., S1, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with one another over backhaul links 134 (e.g., X1, etc.), which may be wired or wireless communication links. In some examples, base station 105 may include a communication management component 350 to perform one or more techniques of the present disclosure.

Specifically, aspects of the present disclosure configure a base station 105 to transmit a notification message to one or more UEs 115 that identifies the port allocations for the UE 115 in order to avoid transmission of redundant downlink control information (e.g., port allocation information). In some examples, CSI-RS ports may be associated with the DM-RS ports. As such, a base station 105, when transmitting PDSCH to the UE 115, may indicate to the UE 115 (e.g., in a downlink grant included in downlink control information (DCI)) that the DM-RS port allocation for the UE 115 is the same as the CSI-RS port allocation that was allocated to the UE 115 in a preceding slot. To this end, the communication management component 350 may implement techniques for the indication of the DL DM-RS ports for the data channel in NR communications. In some examples, the CSI-RS may be associated with a corresponding DM-RS for a DL data channel. In some aspects, the CSI-RS may be either included in the control channel region or the data channel region. The communication management component 350, in some examples, may further transmit the notification that may provide resource allocations (e.g., port allocations) that minimize the redundant control information that is required to be transmitted from the base station to the UE 115 when the DM-RS port allocation is the same as the CSI-RS port allocation received by the UE 115 in an earlier time slot. To that end, the communication management component 350 may map the CSI-RS ports to the DM-RS ports according to a one-to-one relation. The base station 105 may also configure a non-zero power (NZP) CSI-RS resource with a set of CSI-RS ports that are further associated with a DM-RS scrambling identity (ID). As such, during the transmission of the DM-RS, the base station may simply indicate that the DM-RS port allocation is the same as a previous CSI-RS port allocation associated with a DM-RS scrambling ID. Based on the notification, the UE may be configured to determine the DM-RS ports for the PDSCH transmission intended for the UE, and the DM-RS ports for the PDSCH transmission intended for the other co-scheduled UEs. Components and subcomponents of the communication management component 350 are described in detail with reference to FIG. 3.

The base stations 105 may wirelessly communicate with the UEs 115 via one or more base station antennas. Each of the base stations 105 may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, a relay, or some other suitable terminology. The geographic coverage area 110 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G, 4G/LTE, 3G, Wi-Fi, Bluetooth, etc.), and thus there may be overlapping geographic coverage areas 110 for different communication technologies.

In some examples, the wireless communication network 100 may be or include a Long Term Evolution (LTE) or LTE-Advanced (LTE-A) technology network. The wireless communication network 100 may also be a next generation technology network, such as a 5G wireless communication network. In LTE/LTE-A networks, the term evolved node B (eNB) may be generally used to describe the base stations 105, while the term UE may be generally used to describe the UEs 115. The wireless communication network 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by the UEs 115 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by the UEs 115 with service subscriptions with the network provider. A femto cell may also cover a small geographic area (e.g., a home) and may provide restricted access and/or unrestricted access by the UEs 115 having an association with the femto cell (e.g., in the restricted access case, the UEs 115 in a closed subscriber group (CSG) of the base station 105, which may include the UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A radio link control (RLC) layer may perform packet segmentation and reassembly to communicate over logical channels. A MAC layer may perform priority handling and multiplexing of logical channels into transport channels. The MAC layer may also use HARQ to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels.

The UEs 115 may be dispersed throughout the wireless communication network 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, an entertainment device, a vehicular component, medical device, wearable, implantable, pharmaceutical, industrial equipment, or any device capable of communicating in wireless communication network 100. Additionally, a UE 115 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. A UE 115 may be able to communicate with various types of base stations 105 and network equipment including macro eNBs, small cell eNBs, relay base stations, and the like.

A UE 115 may be configured to establish one or more wireless communication links 125 with one or more base stations 105. The wireless communication links 125 shown in wireless communication network 100 may carry uplink (UL) transmissions from a UE 115 to a base station 105, or downlink (DL) transmissions, from a base station 105 to a UE 115. The downlink transmissions may also be called forward link transmissions while the uplink transmissions may also be called reverse link transmissions. Each wireless communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the communication links 125 may represent one or more broadcast channels.

In some aspects of the wireless communication network 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple input multiple output (MIMO) techniques that may take advantage of multi-path environments to transmit multiple spatial layers carrying the same or different coded data.

The wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

Figure 2:
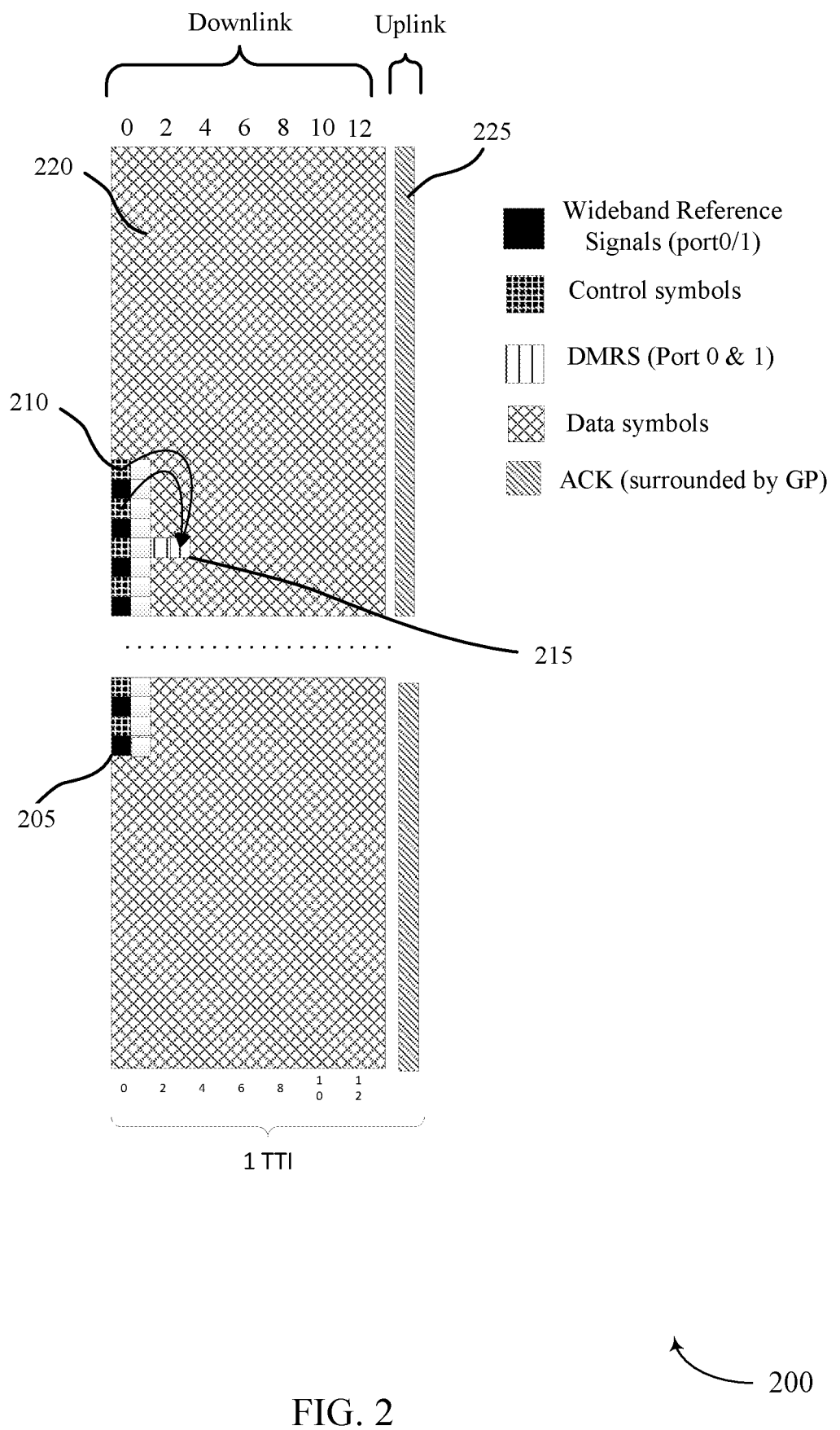
FIG. 2 is an example of a resource grid for transmitting one or more subframes to the receiving device in accordance with aspects of the present disclosure.

FIG. 2 is an example of a resource grid 200 for transmitting one or more subframes to one or more UEs to implement techniques for the indication of the DL DM-RS ports for the data channel in NR communications in accordance with aspects of the present disclosure. The resource grid may include one or more OFDM symbols. The OFDM symbols may include a plurality of resource elements. Resource elements may be the smallest discrete part of the frame and contains complex value representing control and data for a physical channel or signal.

As discussed above, in emerging 5G NR communications technology, the devices may rely primarily on DMRS for signal demodulation, while omitting (or minimizing) the use of CRS from transmitted signals. The DMRS may be in the form of DMRS for control, open-loop MIMO based DMRS, closed-loop MIMO based DMRS, etc. Accordingly, in absence of traditional CRS that is typically used in the LTE systems, for 5G NR communications technology, aspects of the present disclosure can rely on a wideband reference signal 205 to improve the narrowband channel estimation performance. The wideband reference signals may be associated with DMRS 215 for the data channel. Wideband reference signals may be included in either the control channel region or the data channel region.

In the illustrated example, one resource block may be allocated to DMRS 215. To improve channel estimation, a resource block associated with the DMRS 215 may be precoded by wideband reference signal. In some examples, both DMRS 215 and data 220 may have a different power control level from the wideband reference signal.

In some examples, aspects of the present disclosure may associate the wideband reference signal 205, which may be CRS, CSI-RS in downlink or uplink SRS, with a narrowband DMRS in a data channel. In some aspects, the wideband reference signal 205 may be either included in the control channel region or the data channel region. The transmitting device, in some examples, may further transmit a notification to a receiving device that indicates whether the wideband reference signal can be used for data channel demodulation based on the association.

Additionally, or alternatively, in some systems, precoding by the transmitting device may be used to support spatial multiplexing and allowing multiple signal streams to be transmitted simultaneously. In some examples, the transmitting device (e.g., base station) may determine optimal precoding vectors based on the propagation channel between the transmitting device antennas and the targeted UE. If the precoding for wideband reference signal is different from the precoding for the DMRS, the transmitting device may transmit the precoding vector information (either explicitly indicated or determined or derived based on one or more rules) such that the UE 115 may properly demodulate the received signal.

The base station 105, based on the measurements from the uplink SRS transmission from the multiple UEs, may determine a set of co-scheduled UEs for MU-MIMO transmission, the rank for each of the co-scheduled UEs, and the precoding to be applied to each of the DM-RS antenna ports of the co-scheduled UEs. Furthermore, as noted above, the base station may transmit the beam-formed CSI-RS to the co-scheduled UEs using the same precoding and the same rank as the DM-RS, one or more slots before the transmission of the DM-RS/PDSCH. Such beam-formed CSI-RS transmitted prior to the subsequent transmission of associated DM-RS may be referred to as "pre-scheduled" CSI-RS.

To avoid transmission of redundant downlink control information (e.g., port allocation information), aspects of the present disclosure configure a base station to transmit a notification message to one or more UEs that identifies the port allocations for the UE. Specifically, in some examples, CSI-RS ports may be associated with the DM-RS ports. As such, the base station, when transmitting PDSCH to the UE, may indicate to the UE in the downlink grant (e.g., included in downlink DCI) that the DM-RS port allocation for the UE is the same as the CSI-RS port allocation that was allocated to the UE in a preceding slot. To that end, a one-to-one relation between the DM-RS ports and the CSI-RS ports may be defined. The base station may also configure a NZP CSI-RS resource with a set of CSI-RS ports that are associated with a DM-RS scrambling ID.

By way of an example, DM-RS ports 10, 11, 12, and 13 may be mapped to CSI-RS ports 100, 101, 102, and 103, respectively. In this example, the base station may further configure a NZP CSI-RS resource "1" for channel and interference measurement. The base station may also associate the NZP CSIRS resource "1" with DM-RS scrambling ID "4." The NZP CSI-RS resource 1 may include CSI-RS ports 100, 101, and 102 that are each associated with the DM-RS scrambling ID "4."

Thus, in accordance with aspects of the present disclosure, during the transmission of the slot that contains the pre-scheduled CSIRS, the base station may indicate to the first UE that CSI-RS ports 100 and 101 associated with DM-RS scrambling ID "4" are for the channel measurement. By process of elimination, the first UE receiving the notification from the base station, may determine that while CSI-RS ports 100 and 101 associated with DM-RS scrambling ID "4" are for channel measurement, CSI-RS port 102 associated with DM-RS scrambling ID "4" may be used for the interference measurement. Thus, when the first UE receives DM-RS, with the indication that DM-RS port allocation is the same as the CSI-RS port allocation, the first UE is able to determine that DM-RS ports 10 and 11 with the DM-RS scrambling ID "4" may be for PDSCH transmission for the first UE, while DM-RS port 12 with DM-RS scrambling ID "4" may be for PDSCH transmission to a second UE.

Similarly, the base station may indicate to the second UE that CSI-RS port 102 associated with DM-RS scrambling ID "4" is for the channel measurement. The second UE would thus recognize that the CSI-RS ports 100 and 101 associated with DM-RS scrambling ID "4" are for the interference measurements. As such, when the second UE receives DM-RS with the indication that DM-RS port allocation is the same as the CSI-RS port allocation, the second UE may determine that the DM-RS port 12 with DM-RS scrambling ID "4" may be for PDSCH transmission for the second UE, while DM-RS ports 10 and 11 with DM-RS scrambling ID "4" may be for PDSCH transmission for the other UEs (e.g., first UE).

Additionally, or alternatively, to support the non-orthogonal DM-RS ports, features of the present disclosure may configure multiple NZP CSIRS resources, each associated with a DM-RS scrambling ID, but each with a subset of the same set of CSI-RS ports. For example, the base station may configure two NZP CSI-RS resources for channel and interference measurement. The base station may associate NZP CSI-RS resource 1 with DM-RS scrambling ID=1, and NZP CSI-RS resource 2 with DM-RS scrambling ID=2. NZP CSI-RS resource 1 may include CSI-RS ports {100, 101, 102, and 103}, each associated with DM-RS scrambling ID=1. NZP CSI-RS resource 2 may include the CSI-RS ports {100 and 101} associated with DM-RS scrambling ID=2. Thus, in the above example, the base station may configure a first NZP CSI-RS resource with a first set of the one or more CSI-RS ports to a first DM-RS scrambling ID, a second NZP CSI-RS resource with a second set of the one or more CSI-RS ports to a second DM-RS scrambling ID. In some examples, while the first set of the one or more CSI-RS ports and second set of the one or more CSI-RS ports may be selected from a group of available CSI-RS ports.

In the above example, DM-RS ports 10, 11, 12, and 13 may be mapped to CSI-RS ports 100, 101, 102, and 103, respectively. During the transmission of the slot that contains the pre-scheduled CSIRS, the base station may indicate to the first UE that CSI-RS port 101 associated with DM-RS scrambling ID=1 is for channel measurement. As such, the UE, by process of elimination, may determine that the CSI-RS ports {100, 102, 103} associated with DM-RS scrambling ID=1 are reserved for interference measurement.

Also, UE may determine that the CSIRS ports {100, 101} associated with DM-RS scrambling ID=2 are for the interference measurement.

Thus, when the first UE receives a DM-RS with the indication that the DM-RS port allocation is the same as the CSI-RS port allocation, the UE may determine that DM-RS port 11 with the DM-RS scrambling ID=1 is for the PDSCH transmission to the first UE, and DM-RS ports {10, 12, 13} with DM-RS scrambling ID=1 and DM-RS ports {10, 11} with DM-RS scrambling ID=2 are for PDSCH transmission to other UEs. This may help the UE employ the advanced receiver processing by allowing the channel estimation of the layers corresponding to the non-orthogonal ports of the other UEs since the scrambling IDs may become associated to the UE.

Figure 3:
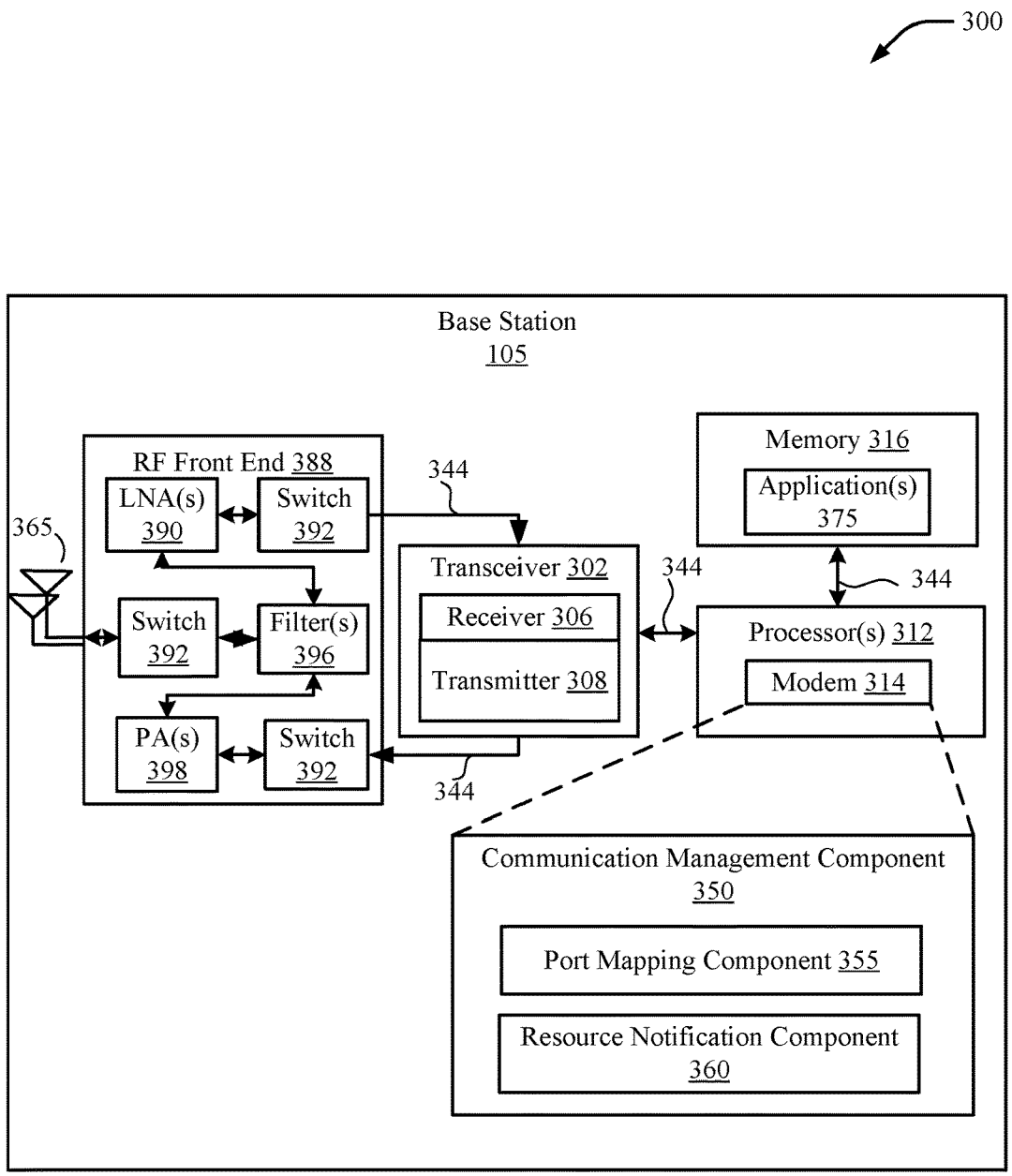
FIG. 3 illustrates an example of a schematic diagram of an aspect of an implementation of various components of a transmitting device (e.g., base station) in accordance with various aspects of the present disclosure.

FIG. 3 describes hardware components and subcomponents of a device that may be a transmitting device (e.g., a base station 105) for implementing one or more methods (e.g., method 400) described herein in accordance with various aspects of the present disclosure. For example, one example of an implementation of the transmitting device may include a variety of components, some of which have already been described above, but including components such as one or more processors 312 and memory 316 and transceiver 302 in communication via one or more buses 344, which may operate in conjunction with the communication management component 350 to enable signal generation that allows for one or more receiving device (e.g., UEs 115) to properly demodulate the received signal. In some examples, the communication management component 350 may be configured to determine whether to include and/or associate the CSI-RS to a DM-RS for channel estimation. Thus, the communication management component 350 may perform functions described herein related to including one or more methods of the present disclosure.

Additionally, or alternatively, the communication management component 350 may be configured to provide notification regarding the port allocations to the UE. As noted above, for a DM-RS port corresponding to the pre-scheduled CSI-RS, there may be a corresponding CSI-RS port for which the same precoding for the DM-RS port is employed. Therefore, by using the pre-scheduled CSI-RS, the UE may be able to compute and provide feedback of accurate MU-CQI to the base station.

In some examples, the communication management component 350 may indicate NZP-CSI-RS resources used for channel/interference measurement to the UE. This indication may include the information regarding which CSI-RS ports are for the channel measurement and which CSI-RS ports are for the interference measurement (e.g., of the interlayer interference resulting from MU-MIMO transmission). The NZP CSI-RS resources for channel/interference measurements may be indicated by a common DCI in order to save DCI overhead. Further, which CSI-RS ports are used for the channel measurement may be indicated by UE-specific DCI.

When the pre-scheduled CSI-RS is transmitted, the information for the CSI-RS port allocation regarding the channel or interference measurement may essentially be the same as the information for the DM-RS port allocation for the UE. Thus, in some examples, port mapping component 355 may map the CSI-RS ports to the DM-RS ports according to a one-to-one relation that may be defined either by a rule in the standard, or by a higher layer (e.g., RRC). The DM-RS port corresponding to the CSI-RS port for the channel measurement is the port allocated for the PDSCH transmission to the UE. Similarly, the DM-RS port corresponding to the CSI-RS port for the interference measurement may be the port allocated for PDSCH transmission for the other interfering UE. In other words, the DCI for the CSI-RS port allocation regarding the channel or interference measurement may be sufficient for processing the DM-RS corresponding to the CSI-RS, for the purpose of the PDSCH demodulation. Hence, by defining the mapping of the CSI-RS ports to the DM-RS ports, the transmission of redundant information regarding DM-RS port allocation, which reduces the control channel capacity, may be avoided.

For example, in one instant, the base station may have to transmit the DCI for the pre-scheduled CSI-RS port allocation associated with the DM-RS to be sent in the future slot. In this instance, the base station may also have to transmit the DCI for the DM-RS port allocation associated with the pre-scheduled CSI-RS sent in the past slot. This redundant transmission may be avoided by implementing the techniques described herein.

Aspects of the present disclosure solve the above-identified problem by implementing techniques wherein when the base station sends the PDSCH to the UE, corresponding to the pre-scheduled CSI-RS, the base station may indicate to the UE in the downlink grant that the DM-RS port allocation is the same as the CSIRS port allocation received predetermined number of slots prior. To achieve this, one-to-one mapping between the DM-RS ports and CSI-RS ports may be provided by the port mapping component 355.

By way of an example, DM-RS ports 10, 11, 12, and 13 may be mapped to CSI-RS ports 100, 101, 102, and 103, respectively. In this example, the base station may further configure a NZP CSI-RS resource "1" for channel and interference measurement. The base station may also associate the NZP CSIRS resource "1" with DM-RS scrambling ID "4." The NZP CSI-RS resource 1 may include CSI-RS ports 100, 101, and 102 that are each associated with the DM-RS scrambling ID "4."

Thus, in accordance with aspects of the present disclosure, during the transmission of the slot that contains the pre-scheduled CSI-RS, the base station may indicate to the first UE that CSI-RS ports 100 and 101 associated with DM-RS scrambling ID "4" are for the channel measurement. By process of elimination, the first UE receiving the notification from the base station, may determine that while CSI-RS ports 100 and 101 associated with DM-RS scrambling ID "4" are for channel measurement, CSI-RS port 102 associated with DM-RS scrambling ID "4" may be used for the interference measurement. Thus, when the first UE receives DM-RS, with the indication that DM-RS port allocation is the same as the CSI-RS port allocation, the first UE is able to determine that DM-RS ports 10 and 11 with the DM-RS scrambling ID "4" may be for PDSCH transmission for the first UE, while DM-RS port 12 with DM-RS scrambling ID "4" may be for PDSCH transmission to a second UE.

Similarly, the base station may indicate to the second UE that CSI-RS port 102 associated with DM-RS scrambling ID "4" is for the channel measurement. The second UE would thus recognize that the CSI-RS ports 100 and 101 associated with DM-RS scrambling ID "4" are for the interference measurements. As such, when the second UE receives DM-RS with the indication that DM-RS port allocation is the same as the CSI-RS port allocation, the second UE may determine that the DM-RS port 12 with DM-RS scrambling ID "4" may be for PDSCH transmission for the second UE, while DM-RS ports 10 and 11 with DM-RS scrambling ID "4" may be for PDSCH transmission for the other UEs (e.g., first UE).

Additionally, or alternatively, to support the non-orthogonal DM-RS ports, features of the present disclosure may configure multiple NZP CSIRS resources, each associated with a DM-RS scrambling ID, but each with a subset of the same set of CSI-RS ports. For example, the base station may configure two NZP CSI-RS resources for channel and interference measurement. The base station may associate NZP CSI-RS resource 1 with DM-RS scrambling ID=1, and NZP CSI-RS resource 2 with DM-RS scrambling ID=2. NZP CSI-RS resource 1 may include CSI-RS ports {100, 101, 102, and 103}, each associated with DM-RS scrambling ID=1. NZP CSI-RS resource 2 may include the CSI-RS ports {100 and 101} associated with DM-RS scrambling ID=2.

In the above example, DM-RS ports 10, 11, 12, and 13 may be mapped to CSI-RS ports 100, 101, 102, and 103, respectively by the port mapping component 355. During the transmission of the slot that contains the pre-scheduled CSIRS, the base station may indicate to the first UE that CSI-RS port 101 associated with DM-RS scrambling ID=1 is for channel measurement. As such, the UE, by process of elimination, may determine that the CSI-RS ports {100, 102, 103} associated with DM-RS scrambling ID=1 are reserved for interference measurement. Also, UE would determine that the CSIRS ports {100, 101} associated with DM-RS scrambling ID=2 are for the interference measurement.

Thus, when the first UE receives a DM-RS with the indication that the DM-RS port allocation is the same as the CSI-RS port allocation, the UE may determine that DM-RS port 11 with the DM-RS scrambling ID=1 is for the PDSCH transmission to the first UE, and DM-RS ports {10, 12, 13} with DM-RS scrambling ID=1 and DM-RS ports {10, 11} with DM-RS scrambling ID=2 are for PDSCH transmission to other UEs. This may help the UE to employ the advanced receiver processing by allowing the channel estimation of the layers corresponding to the non-orthogonal ports of the other UE's, since the scrambling IDs become known to the UE.

The one or more processors 312, modem 314, memory 316, transceiver 302, RF front end 388 and one or more antennas 365, may be configured to support voice and/or data calls (simultaneously or non-simultaneously) in one or more radio access technologies. In an aspect, the one or more processors 312 can include a modem 314 that uses one or more modem processors. The various functions related to communication management component 350 may be included in modem 314 and/or processors 312 and, in an aspect, can be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiver processor, or a transceiver processor associated with transceiver 302. In other aspects, some of the features of the one or more processors 312 and/or modem 314 associated with communication management component 350 may be performed by transceiver 302.

Also, memory 316 may be configured to store data used herein and/or local versions of applications 375 or communication management component 350 and/or one or more of its subcomponents being executed by at least one processor 312. Memory 316 can include any type of computer-readable medium usable by a computer or at least one processor 312, such as random-access memory (RAM), read only memory (ROM), tapes, magnetic discs, optical discs, volatile memory, non-volatile memory, and any combination thereof. In an aspect, for example, memory 316 may be a non-transitory computer-readable storage medium that stores one or more computer-executable codes defining communication management component 350 and/or one or more of its subcomponents, and/or data associated therewith, when UE 115 is operating at least one processor 312 to execute communication management component 350 and/or one or more of its subcomponents.

Transceiver 302 may include at least one receiver 306 and at least one transmitter 308. Receiver 306 may include hardware, firmware, and/or software code executable by a processor for receiving data, the code comprising instructions and being stored in a memory (e.g., computer-readable medium). Receiver 306 may be, for example, a radio frequency (RF) receiver. In an aspect, receiver 306 may receive signals transmitted by at least one UE 115. Additionally, receiver 306 may process such received signals, and also may obtain measurements of the signals, such as, but not limited to, Ec/Io, SNR, RSRP, RSSI, etc. Transmitter 308 may include hardware, firmware, and/or software code executable by a processor for transmitting data, the code comprising instructions and being stored in a memory (e.g., computer-readable medium). A suitable example of transmitter 308 may including, but is not limited to, an RF transmitter.

Moreover, in an aspect, transmitting device may include RF front end 388, which may operate in communication with one or more antennas 365 and transceiver 302 for receiving and transmitting radio transmissions, for example, wireless communications transmitted by at least one base station 105 or wireless transmissions transmitted by UE 115. RF front end 388 may be connected to one or more antennas 365 and can include one or more low-noise amplifiers (LNAs) 390, one or more switches 392, one or more power amplifiers (PAs) 398, and one or more filters 396 for transmitting and receiving RF signals.

In an aspect, LNA 390 can amplify a received signal at a desired output level. In an aspect, each LNA 390 may have a specified minimum and maximum gain values. In an aspect, RF front end 388 may use one or more switches 392 to select a particular LNA 390 and its specified gain value based on a desired gain value for a particular application.

Further, for example, one or more PA(s) 398 may be used by RF front end 388 to amplify a signal for an RF output at a desired output power level. In an aspect, each PA 398 may have specified minimum and maximum gain values. In an aspect, RF front end 388 may use one or more switches 392 to select a particular PA 398 and its specified gain value based on a desired gain value for a particular application.

Also, for example, one or more filters 396 can be used by RF front end 388 to filter a received signal to obtain an input RF signal. Similarly, in an aspect, for example, a respective filter 396 can be used to filter an output from a respective PA 398 to produce an output signal for transmission. In an aspect, each filter 396 can be connected to a specific LNA 390 and/or PA 398. In an aspect, RF front end 388 can use one or more switches 392 to select a transmit or receive path using a specified filter 396, LNA 390, and/or PA 398, based on a configuration as specified by transceiver 302 and/or processor 612.

As such, transceiver 302 may be configured to transmit and receive wireless signals through one or more antennas 365 via RF front end 388. In an aspect, transceiver 302 may be tuned to operate at specified frequencies such that transmitting device can communicate with, for example, one or more base stations 105 or one or more cells associated with one or more base stations 105. In an aspect, for example, modem 314 can configure transceiver 302 to operate at a specified frequency and power level based on the configuration of the transmitting device and the communication protocol used by modem 314.

In an aspect, modem 314 can be a multiband-multimode modem, which can process digital data and communicate with transceiver 302 such that the digital data is sent and received using transceiver 302. In an aspect, modem 314 can be multiband and be configured to support multiple frequency bands for a specific communications protocol. In an aspect, modem 314 can be multimode and be configured to support multiple operating networks and communications protocols. In an aspect, modem 314 can control one or more components of transmitting device (e.g., RF front end 388, transceiver 302) to enable transmission and/or reception of signals from the network based on a specified modem configuration. In an aspect, the modem configuration can be based on the mode of the modem and the frequency band in use. In another aspect, the modem configuration can be based on UE configuration information associated with transmitting device as provided by the network during cell selection and/or cell reselection.

Figure 4:
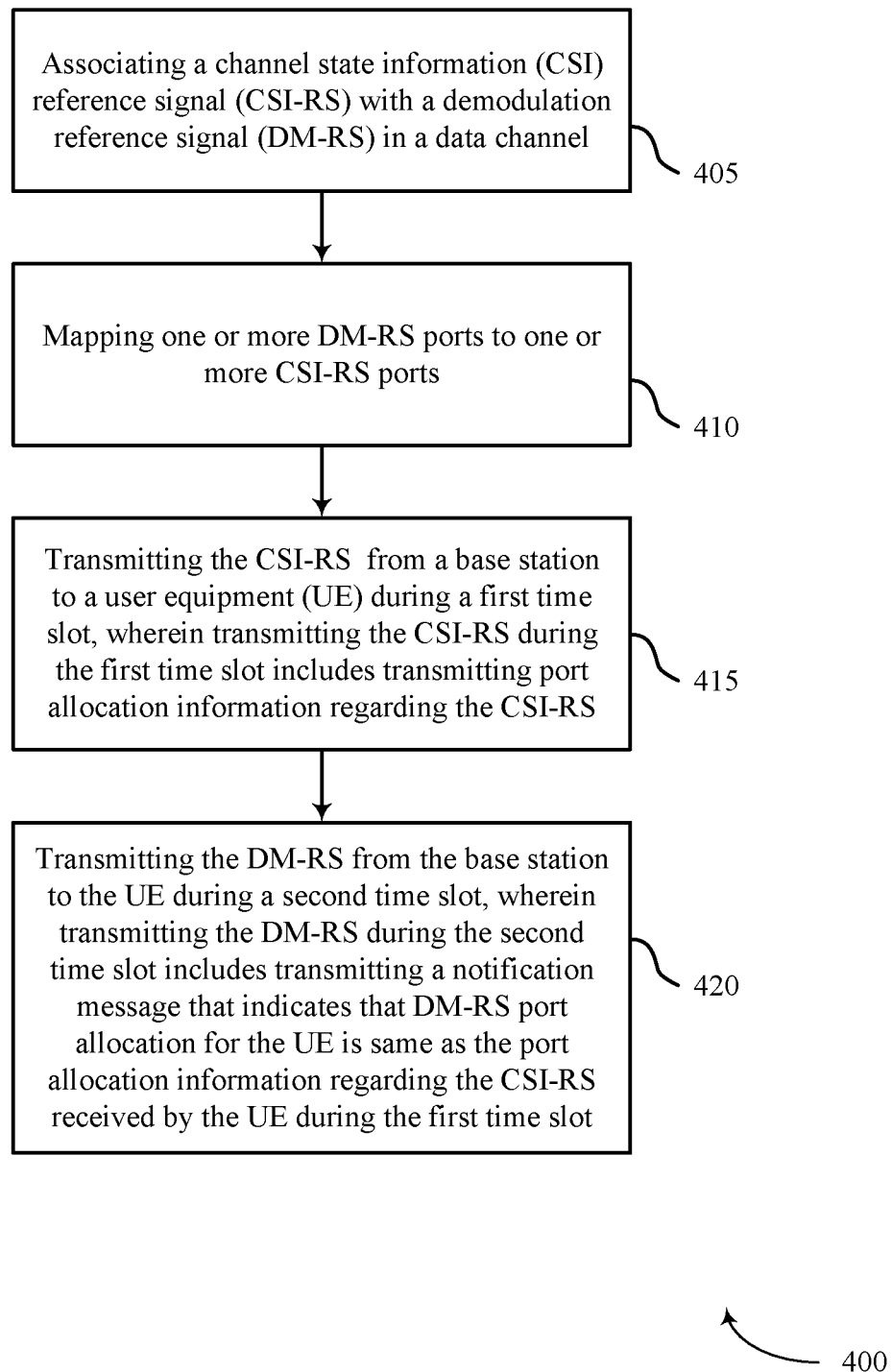
FIG. 4 illustrates an example of a method of wireless communication in accordance with aspects of the present disclosure

FIG. 4 is a flowchart of an example method 400 for transmitting subframes in wireless communications in accordance with aspects of the present disclosure. The method 400 may be performed using an apparatus (e.g., the base station 105). In some examples, the methods of the present disclosure may allow a receiving device (e.g., UE 115) to demodulate the received signal with improved channel estimation performance. Although the method 400 is described below with respect to the elements of the transmitting device (e.g., the base station 105), other components may be used to implement one or more of the steps described herein.

At block 405, the method may include associating a CSI-RS with a DM-RS in a data channel. Aspects of block 405 may be performed by communication management component 350 described with reference to FIG. 2. Specifically, the communication management component 350 that is part of the modem 314 of the base station 105 may associate CSI-RS ports with the DM-RS ports. Associating the CSI-RS ports with DM-RS ports may avoid transmission of redundant downlink control information (e.g., port allocation information) and thereby improve resource management and bandwidth efficiency.

At block 410, the method may include mapping one or more DM-RS ports to one or more CSI-RS ports. Specifically the port mapping component 355 of the communication management component 350 included in the modem 314 may configure NZP CSI-RS resource with a DM-RS scrambling ID. In the instance where non-orthogonal DM-RS ports are to be supported, the base station may configure a first NZP CSI-RS resource associated with a first DM-RS scrambling ID and configure a second NZP CSI-RS resource associated with a second DM-RS scrambling ID. Aspects of block 410 may also be performed by port mapping component 355 described with reference to FIG. 2.

At block 415, the method may include transmitting the pre-scheduled CSI-RS from a base station to a UE during a first time slot. Transmitting the CSI-RS during the first time slot may include transmitting port allocation information regarding the CSI-RS. Aspects of block 415 may also be performed by transceiver 302 described with reference to FIG. 2.

At block 420, the method may include transmitting the DM-RS from the base station to the UE during a second time slot. Transmitting the DM-RS during the second time slot may include transmitting a notification message that indicates that DM-RS port allocation for the UE is same as the port allocation information regarding the CSI-RS received by the UE during the first time slot. The notification message may include identification of the first time slot, which may allow UE to identify the corresponding one or more DM-RS ports associated with one or more CSI-RS ports. Aspects of block 415 may also be performed by transceiver 302 and resource notification component 360 described with reference to FIG. 3.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

It should be noted that the techniques described above may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communications, comprising:
associating a channel state information (CSI) reference signal (CSI-RS) with a demodulation reference signal (DM-RS) in a data channel;
mapping one or more DM-RS ports to one or more CSI-RS ports;
transmitting the CSI-RS from a base station to a user equipment (UE) during a first time slot, wherein transmitting the CSI-RS during the first time slot includes transmitting port allocation information regarding the CSI-RS; and
transmitting the DM-RS from the base station to the UE during a second time slot, wherein transmitting the DM-RS during the second time slot includes transmitting a notification message that indicates that DM-RS port allocation for the UE is same as the port allocation information regarding the CSI-RS received by the UE during the first time slot.

2. The method of claim 1, further comprises:
configuring non-zero power (NZP) CSI-RS resource associated with a DM-RS scrambling identity (ID).

3. The method of claim 1, further comprising:
configuring a first non-zero power (NZP) CSI-RS resource with a first set of the one or more CSI-RS ports to a first DM-RS scrambling identity (ID); and
configuring a second NZP CSI-RS resource with a second set of the one or more CSI-RS ports to a second DM-RS scrambling ID, wherein the first set of the one or more CSI-RS ports and the second set of the one or more CSI-RS ports are selected from a group of available CSI-RS ports.

4. The method of claim 1, wherein the notification message includes identification of the first time slot, which allows UE to identify the corresponding one or more DM-RS ports associated with the one or more CSI-RS ports.

5. The method of claim 1, further comprises:
configuring a first non-zero power (NZP) CSI-RS resource associated with a first DM-RS scrambling identity (ID); and
configuring a second NZP CSI-RS resource associated with a second DM-RS scrambling ID.

6. An apparatus for wireless communications, comprising:
a memory configured to store instructions; and
a processor communicatively coupled with the memory, the processor configured to execute the instructions to:
associate a channel state information (CSI) reference signal (CSI-RS) with a demodulation reference signal (DM-RS) in a data channel;
map one or more DM-RS ports to one or more CSI-RS ports;

transmit the CSI-RS from a base station to a user equipment (UE) during a first time slot, wherein transmitting the CSI-RS during the first time slot includes transmitting port allocation information regarding the CSI-RS; and transmit the DM-RS from the base station to the UE during a second time slot, wherein transmitting the DM-RS during the second time slot includes transmitting a notification message that indicates that DM-RS port allocation for the UE is same as the port allocation information regarding the CSI-RS received by the UE during the first time slot.

7. The apparatus of claim 6, wherein the processor is further configured to execute the instructions to:
configure non-zero power (NZP) CSI-RS resource associated with a DM-RS scrambling identity (ID).

8. The apparatus of claim 6, wherein the processor is further configured to execute the instructions to:
configure a first non-zero power (NZP) CSI-RS resource with a first set of the one or more CSI-RS ports to a first DM-RS scrambling identity (ID); and
configure a second NZP CSI-RS resource with a second set of the one or more CSI-RS ports to a second DM-RS scrambling ID, wherein the first set of the one or more CSI-RS ports and the second set of the one or more CSI-RS ports are selected from a group of available CSI-RS ports.

9. The apparatus of claim 6, wherein the notification message includes identification of the first time slot, which allows UE to identify the corresponding one or more DM-RS ports associated with the one or more CSI-RS ports.

10. The apparatus of claim 6, wherein the processor is further configured to execute the instructions to:
configure a first non-zero power (NZP) CSI-RS resource associated with a first DM-RS scrambling identity (ID); and
configure a second NZP CSI-RS resource associated with a second DM-RS scrambling ID.

11. A non-transitory computer readable medium for wireless communications, comprising code executable by a processor for:
associating a channel state information (CSI) reference signal (CSI-RS) with a demodulation reference signal (DM-RS) in a data channel;
mapping one or more DM-RS ports to one or more CSI-RS ports;
transmitting the CSI-RS from a base station to a user equipment (UE) during a first time slot, wherein transmitting the CSI-RS during the first time slot includes transmitting port allocation information regarding the CSI-RS; and
transmitting the DM-RS from the base station to the UE during a second time slot, wherein transmitting the DM-RS during the second time slot includes transmitting a notification message that indicates that DM-RS port allocation for the UE is same as the port allocation information regarding the CSI-RS received by the UE during the first time slot.

12. The non-transitory computer readable medium of claim 11, further comprising code for:
configuring non-zero power (NZP) CSI-RS resource associated with a DM-RS scrambling identity (ID).

13. The non-transitory computer readable medium of claim 11, further comprising code for:

configuring a first non-zero power (NZP) CSI-RS resource with a first set of the one or more CSI-RS ports to a first DM-RS scrambling identity (ID); and
configuring a second NZP CSI-RS resource with a second set of the one or more CSI-RS ports to a second DM-RS scrambling ID, wherein the first set of the one or more CSI-RS ports and the second set of the one or more CSI-RS ports are selected from a group of available CSI-RS ports.

14. The non-transitory computer readable medium of claim 11, wherein the notification message includes identification of the first time slot, which allows UE to identify the corresponding one or more DM-RS ports associated with the one or more CSI-RS ports.

15. The non-transitory computer readable medium of claim 11, further comprising code for:
configuring a first non-zero power (NZP) CSI-RS resource associated with a first DM-RS scrambling identity (ID); and
configuring a second NZP CSI-RS resource associated with a second DM-RS scrambling ID.

16. An apparatus for wireless communications, comprising:
means for associating a channel state information (CSI) reference signal (CSI-RS) with a demodulation reference signal (DM-RS) in a data channel;
means for mapping one or more DM-RS ports to one or more CSI-RS ports;
means for transmitting the CSI-RS from a base station to a user equipment (UE) during a first time slot, wherein transmitting the CSI-RS during the first time slot includes transmitting port allocation information regarding the CSI-RS; and
means for transmitting the DM-RS from the base station to the UE during a second time slot, wherein transmitting the DM-RS during the second time slot includes transmitting a notification message that indicates that DM-RS port allocation for the UE is same as the port allocation information regarding the CSI-RS received by the UE during the first time slot.

17. The apparatus of claim 16, further comprising:
means for configuring non-zero power (NZP) CSI-RS resource associated with a DM-RS scrambling identity (ID).

18. The apparatus of claim 16, further comprising:
means for configuring a first non-zero power (NZP) CSI-RS resource with a first set of the one or more CSI-RS ports to a first DM-RS scrambling identity (ID); and
means for configuring a second NZP CSI-RS resource with a second set of the one or more CSI-RS ports to a second DM-RS scrambling ID, wherein the first set of the one or more CSI-RS ports and the second set of the one or more CSI-RS ports are selected from a group of available CSI-RS ports.

19. The apparatus of claim 16, wherein the notification message includes identification of the first time slot, which allows UE to identify the corresponding one or more DM-RS ports associated with the one or more CSI-RS ports.

20. The apparatus of claim 16, further comprising:
means for configuring a first non-zero power (NZP) CSI-RS resource associated with a first DM-RS scrambling identity (ID); and
means for configuring a second NZP CSI-RS resource associated with a second DM-RS scrambling ID.

* * * * *

UNITED STATES PATENT AND TRADEMARK OFFICE
CERTIFICATE OF CORRECTION

PATENT NO. : 11,329,849 B2
APPLICATION NO. : 16/619038
DATED : May 10, 2022
INVENTOR(S) : June Namgoong et al.

Page 1 of 1

It is certified that error appears in the above-identified patent and that said Letters Patent is hereby corrected as shown below:

On the Title Page

(71) Applicants reads: "QUALCOMM Incorporated, San Diego, CA (US); June Namgoong, San Diego, CA (US); Pavan Kumar Vitthaladevuni, San Diego, CA (US); Yu Zhang, Beijing (CN); Joseph Binamira Soriaga, San Diego, CA (US); Jin Jiang, San Diego, CA (US); Alexandros Manolakos, San Diego, CA (US)"

Should read: --QUALCOMM Incorporated, San Diego, CA (US)--

Signed and Sealed this
Twelfth Day of July, 2022

Katherine Kelly Vidal
*Director of the United States Patent and Trademark Office*